(12) United States Patent
Pereira (10) Patent No.: US 7,606,341 B2
(45) Date of Patent: Oct. 20, 2009

(54) CIRCUIT FOR BIT ALIGNMENT IN HIGH SPEED MULTICHANNEL DATA TRANSMISSION

(75) Inventor: David Pereira, Lisses (FR)

(73) Assignee: International Business Machines Corporation, Armonk, NY (US)

( * ) Notice: Subject to any disclaimer, the term of this patent is extended or adjusted under 35 U.S.C. 154(b) by 668 days.

(21) Appl. No.: 10/710,046

(22) Filed: Jun. 15, 2004

(65) Prior Publication Data

US 2004/0264611 A1    Dec. 30, 2004

(30) Foreign Application Priority Data

Jun. 26, 2003    (EP) .................................. 03368062

(51) Int. Cl.
*H04L 7/00*    (2006.01)
*H04L 25/00*    (2006.01)
*H04L 25/40*    (2006.01)

(52) U.S. Cl. ........................ 375/371; 375/224; 375/226; 375/354

(58) Field of Classification Search ......... 375/354–377, 375/329–306, 224, 226; 713/400–401; 370/298–306
See application file for complete search history.

(56) References Cited

U.S. PATENT DOCUMENTS

| | | | |
|---|---|---|---|
| 4,879,731 A | 11/1989 | Brush | |
| 5,727,021 A | 3/1998 | Truebenbach | |
| 6,065,127 A | 5/2000 | Aizenberg et al. | |
| 6,654,824 B1 * | 11/2003 | Vila et al. | ...................... 710/60 |
| 7,035,368 B2 * | 4/2006 | Pickering et al. | ............. 375/376 |
| 7,054,331 B1 * | 5/2006 | Susnow et al. | ............... 370/465 |
| 2003/0074609 A1 * | 4/2003 | Koyanagi et al. | ........... 714/700 |

FOREIGN PATENT DOCUMENTS

EP    1028369    8/2000

* cited by examiner

*Primary Examiner*—Shuwang Liu
*Assistant Examiner*—James M Perez
(74) *Attorney, Agent, or Firm*—Ian D. MacKinnon (57) ABSTRACT

An alignment circuit is configured to receive a reference clock signal (ref_clk) derived from a main clock having a period T and successive sets of 2n data bits that are transmitted in parallel on a data bus wherein said data bits are aligned with respect to said reference clock signal but misaligned with respect to each other. It first comprises a plurality of n aligners. Each aligner is coupled to said reference clock and a pair of said data bits, referred to as primary bits, one data bit (bit_tdat(i)) having the rank (i) in a determined set and the other being the corresponding data bit (bit_tdat(i+n)) having the rank (i+n) in the set. Each aligner comprises first, second and third shifting means for shifting said primary data bits to respectively generate respective data bits delayed of one, two and two and half cycles and a multiplexor receiving said primary and delayed data bits under the control of three control signals of a first type (recal(i), realign0(i) and realign1 (i)) to generate a pair of aligned data bits (tdat_desk(i) & tdat_desk(i+n)).

2 Claims, 7 Drawing Sheets

CIRCUIT FOR BIT ALIGNMENT IN HIGH SPEED MULTICHANNEL DATA TRANSMISSION

BACKGROUND OF INVENTION

1. Field of the Invention

The present invention relates to high speed networking and more particularly to an improved circuit for bit skew suppression/bit alignment in high speed multichannel data transmission.

2. Background and Objects of the Invention

At high frequency transmission rate, when bits are transferred in parallel on the same bus, for instance at the interface between a telecom chip and a network processor, a misalignment of the bits often occurs. This misalignment, commonly referred to as the skew, is mainly due to transmission path differences, but can result of other factors such as impedance mismatches or delays in the clock signals as well. As a matter of fact, when bits are transferred in parallel at high speed, they go through different paths, and therefore have different arrival times.

Figure 1:
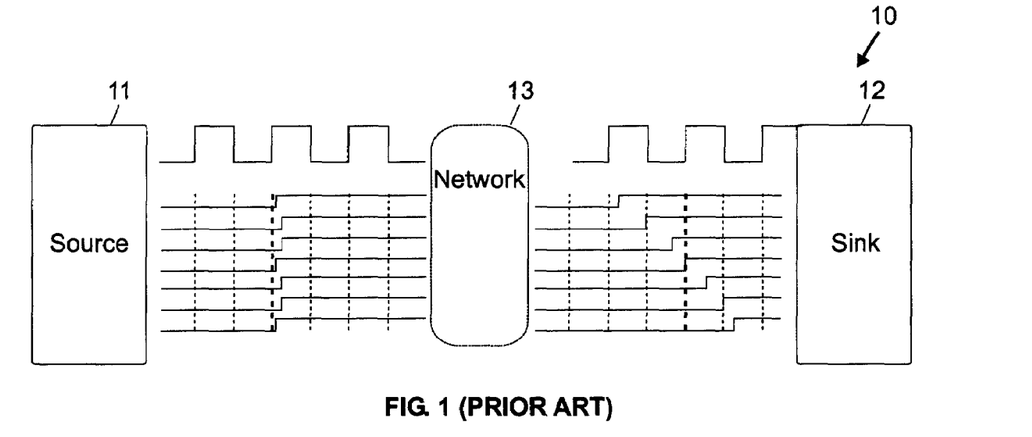
FIG. 1 shows the schematic diagram of a telecommunications system comprised of a source and a sink that exchange data bits via a network, typically a parallel data bus to illustrate the skew that occurs on the transmitted data bits when they are received by the sink with respects to the received clock signal.

FIG. 1 shows a telecommunication system 10 comprised of a source (emitter) 11 and a sink (receiver) 12 that exchange bits via a network 13, typically a bus comprised of a plurality of transmission lines, to illustrate the skew that occur on a set of bits transmitted in parallel vis a vis a clock signal. As apparent in FIG. 1, the slight misalignment that can be noticed at the output of the source 11 is significantly increased after the network 13 before it is applied to the sink 12. To be able to retrieve the bits in a correct order, a deskewing/alignment mechanism must be thus implemented as shown in FIG. 2.

Figure 2:
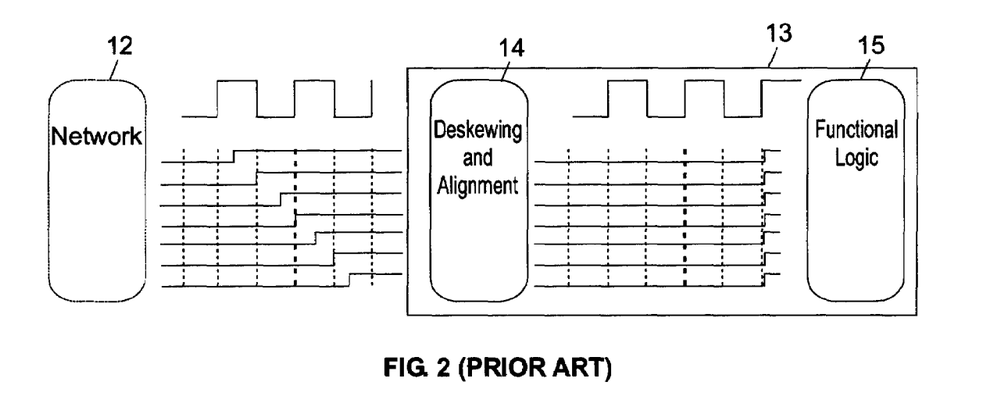
FIG. 2 shows a deskewing and alignment block placed inside the sink in a front end position to align the received data bits with the received clock signal before processing in the functional logic part of a telecom chip.

Now turning to FIG. 2, a deskewing and alignment block 14 is placed inside the sink 13 in a front end position to achieve this result before the aligned bits are processed in the functional logic block 15 as standard. As a result, in a telecom IC chip, the deskewing/alignment function is performed between the input/output terminals (I/Os) and the functional logic of the chip.

For instance, the Frame Based ATM level 4 or the SPI4 phase 2 protocols recommended respectively by the ATM and OIF forums, edict that deskewing is only mandatory if the transmission lines (or links) are running at more than 350 MHz, but not for the lower frequencies (the standard transmission range starts at 310 MHz). When the bits are received in accordance with these protocols, a training sequence is sent inband periodically. The 20-word training pattern consists of 10 repeated training control words followed by 10 repeated training data words, wherein the training data word "1111000000000000" is orthogonal to the training control word "0000111111111111". It is applied to a 17 bit-width data bus, 1 control bit being associated to each set of 16 bits.

Figure 3:
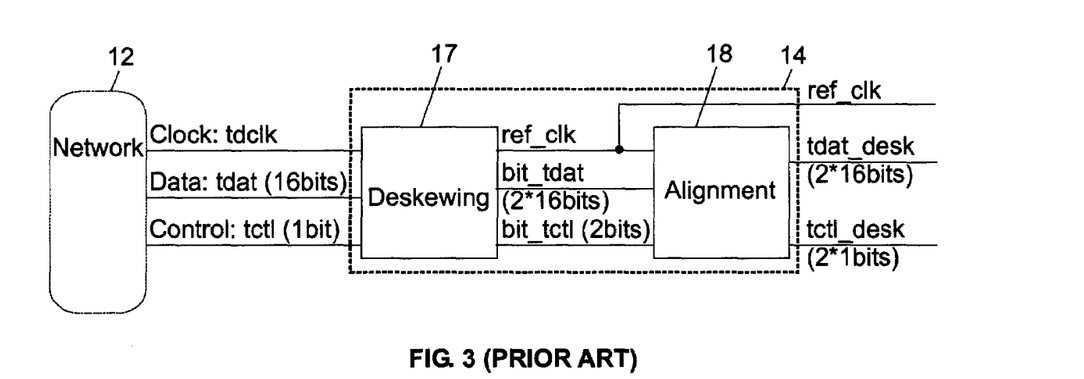
FIG. 3 schematically shows a typical implementation of the deskewing and alignment block of FIG. 2 which is usually comprised of two separate blocks, a deskewing block and an alignment block.

In this context, the role of the deskewing/alignment block 14 is to suppress the skew and properly realign the data and control bits on the main clock. To that end, it analyses the border between the training control words and the training data words to determine the delay which must be added to each transmission line of the data bus to realign the bits. This delay defined on training patterns is then applied to inband data bits. As illustrated in FIG. 3 which schematically shows the block diagram architecture of the deskewing and alignment block 14 of FIG. 2, the deskewing/alignment function is usually performed in two separate blocks: the deskewing block and the alignment block, respectively referenced 17 and 18. The received main clock signal tdclk, the 16 data bits tdat and the single control bit tctl are applied to the deskewing block 17 as inputs. Note that the data and control bits are applied via a bus having a width of 17 bits on each edge of the main clock (double edge clock). In turn, the deskewing block 17 generates an internal reference clock signal (ref_clk), 2*16 data bits (bit_tdat) and 2*1 control bits (bit_tctl) that are sent to the alignment block 18. Said data and control bits are aligned with said reference clock but misaligned with respect to each other. Finally, the alignment block 18 processes these bits and generates 2*16 data bits (tdat_desk) and 2*1 control bits (tctl_desk) that are still aligned with said main clock and are now also aligned with each other.

After reset, the source continuously sends training patterns until enough valid parity values are received. Each control word and especially each training control word includes a parity field which is a diagonal interleaved parity computed on all the data which have been received after the previous control word. The parity values will not be correct until the deskewing is properly done.

It is therefore desirable to have a deskewing/alignment block combination which renders the functional logic block totally skew insensitive on the totality of said standard transmission range. It is also desirable to avoid the need of switching between two telecom systems or operating modes depending on whether the transmission frequency is lower or higher than 350 MHz. It is further desirable to have a deskewing/alignment block combination that performs an automatic discrimination between the data sequences and the training sequences that are periodically sent inband. Finally, it is still further desirable that there is no interaction between the deskewing/alignment block combination and the functional logic block.

SUMMARY OF INVENTION

According to the present invention there is described an improved alignment circuit configured to receive a reference clock signal derived from a main clock having a period T and successive sets of 2n data bits, that are transmitted in parallel on a data bus wherein said data bits are aligned with respect to said reference clock signal but misaligned with respect to each other; said alignment circuit comprising:

a plurality of n aligners, each aligner being coupled to said reference clock and a pair of said data bits, referred to as primary bits, one data bit having the rank (i) in a determined set and the other being the corresponding data bit having the rank (i+n) in the set; each aligner comprising:

first shifting means for shifting said primary data bits to generate respective first and second data bits delayed of one cycle therefrom;

second shifting means for shifting said first and second data bits to generate respective third and fourth data bits delayed of one cycle therefrom;

third shifting means for shifting said fourth data bit to generate a fifth data bit delayed of one half-cycle therefrom;

multiplexing means receiving said primary and delayed data bits under the control of three control signals of a first type to generate a pair of aligned data bits;

so that said plurality of aligners generates 2n data bits that are aligned with said main clock and with each other on a data bus; and, a control block coupled to said primary signals and to all pairs of aligned data bits that determines the end of the alignment operation and generates a control signal of a second type to that end.

The novel features believed to be characteristic of this invention are set forth in the appended claims. The invention itself, however, as well as other objects and advantages thereof, may be best understood by reference to the following detailed description of an illustrated preferred embodiment to be read in conjunction with the accompanying drawings.

DETAILED DESCRIPTION

Description of the Deskewing Block 17 Overall Architecture

Figure 4:
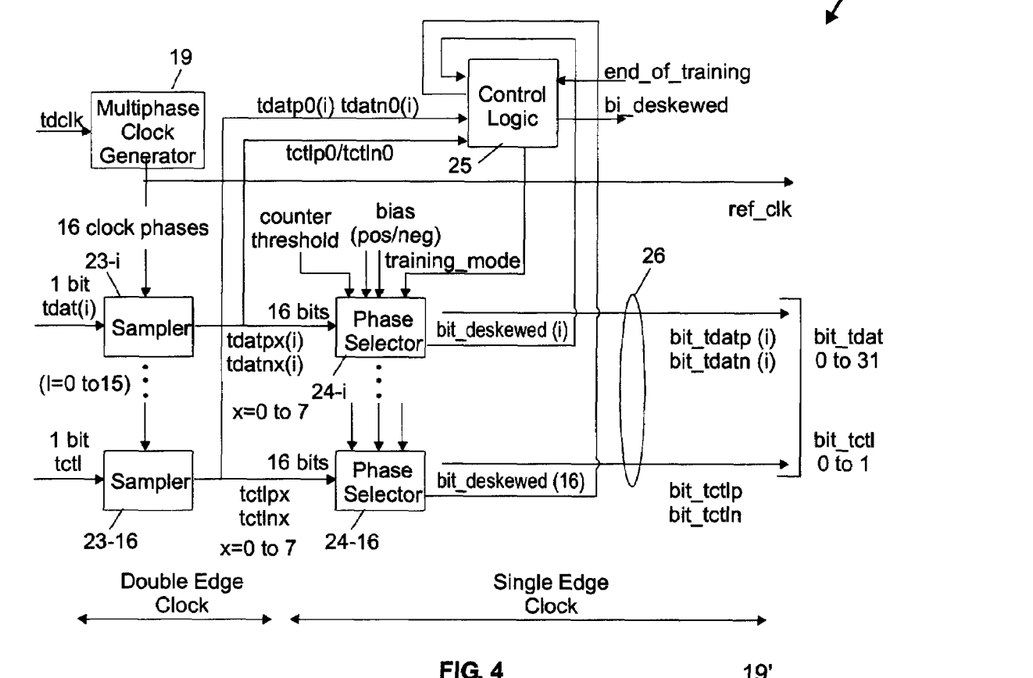
FIG. 4 schematically shows the block diagram architecture of the deskewing block of the present invention.

The block diagram architecture of the deskewing block 17 in accordance with the present invention is shown in FIG. 4. Now turning to FIG. 4, a multiphase clock generator 19 is required to generate an adequate number N, e.g. 16, of clock phases from the main clock labeled tdclk. Let us assume at this stage of the description, that these 16 clock phases are referenced P0 to P7 and N0 to N7 to distinguish between the positive and the negative clock edges as it will be explained in more details in due course. Each data bit, tdat (0) to tdat (15) is applied to a one-bit sampler referenced 23-0 to 23-15 while the control bit tctl is applied to one-bit bit sampler 23-16. The 16 clock phases generated by clock generator 19 are applied to all samplers 23-0 to 23-15 to be used in the overall sampling process. In addition, the sampler is used to perform the clock domain change from the sampling clock to the phase selected as the reference clock, e.g. P0, referred to as ref_clk hereinbelow. As apparent in FIG. 4, data bit tdat (i), wherein i varies from 0 to 15, is applied to bit sampler 23-i and the control bit tctl is applied to sampler 23-16. The signals resulting from the sampling of data bit tdat (i)/control bit tctl are labeled tdatpx (i) and tdatnx (i)/tctlpx and tctlnx, wherein x varies from 0 to 7, depending on whether they are obtained with a positive or a negative clock edge (double edge clock). These signals tdatpx (i) and tdatnx (i) are applied to one-bit phase selector 24-i. The sampled signals tctlpx and tctlnx are applied to one-bit phase selector 24-16. Different control signals are applied to phase selectors 24-0 to 24-16. They include the counter_threshold, the bias (for positive and negative phases) and the training_mode signals. The generation and the role of these signals will be explained later on in due course. The phase selector 24-i generates the bit_deskewed (i) and the two selected data bit signals bit_tdatp (i) and bit_tdatn (i) signals. The bit_deskewed (i) signal is set high to indicate that phase selector 24-i has determined which phases were the best for sampling the data bits. The same reasoning applies to the control bits, phase selector 24-16 generates the bit_deskewed (16) and the selected control bit_tctlp and bit_tcltn signals. The sampled signals tdatp0(i), tdatn0(i), tctlp0 and tctln0 and tctln7 on the one hand and the bit_deskewed (i) signals, wherein i still varies from 0 to 16 on the other hand, are applied to a control logic block 25. This block which also receives the end_of_training signal, generates the training_mode signal mentioned above and the bit_deskewed signal. The latter signal indicates that the operation of determining the best phase in all phase selectors 24-0 to 24-16 has been completed. The sampled signals and the selected signals are made available on a double width data bus 26 that thus transports 32 data bits, referred to as the bit_tda t(0) to bit_tdat (31), (bit_tdat 0 to 31 in short) and 2 control bits referred to as bit_tctl (0) and bit_tctl (1), (bit_tctl 0 to 1 in short), that will be applied to the alignment block 18 shown in FIG. 3. In summary, the main role of the deskewing block 17 is to find the best phase to sample each of the incoming bits and to output 2 sets of data/control bits in the common clock domain (ref_clk). To that end, the samplers 23- are used to sample the bits with different clock phases and the selectors 24- choose the best phase for each bit. On the other hand, the control logic block 25 detects the training sequences and properly drives the phase selectors. In essence, the deskewing block 17 schematically shown in FIG. 4, thus comprises a multiphase clock generator, a control logic block and a plurality of samplers and phase selectors. These specific circuits will be now described in more details.

1. Description of the Multiphase Clock Generator 19

Multiphase clock generator 19 can be implemented either with a controlled delay line loop circuit (DLL) or a phase locked loop circuit (PLL). The latter circuit is more flexible in that it can operate with frequencies as low as 100 MHz. If implemented with a DLL, sixteen different clock phases with a fixed delay between each other are necessary. If implemented with a PLL, sixteen different clock phases equally spaced in the clock period are necessary. In the present implementations, the deskewing mechanism can be used with a double edge clock running between 311 and 400 Mbits/s, which is equivalent to a 622 Mbits/s to 800 Mbits/s range.

Figure 5:
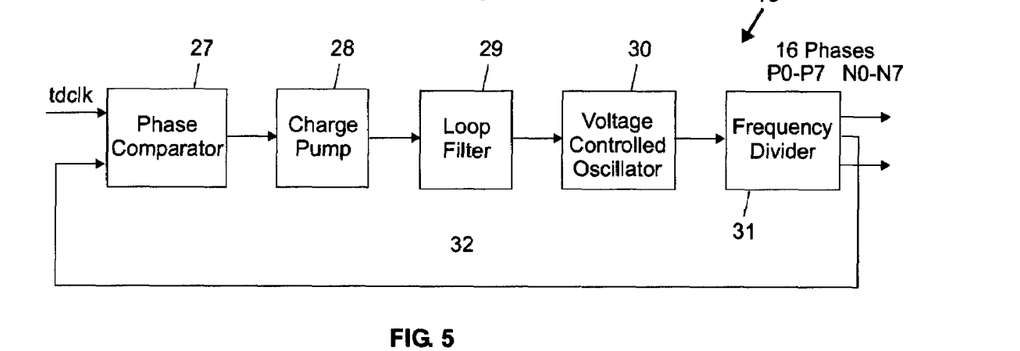
FIG. 5 shows a first implementation of the multiphase clock generator of FIG. 4 using a standard phase locked loop (PLL) circuit designed to generate 16 phases.

FIG. 5 shows a preferred implementation of the multiphase clock generator 19 with a PLL circuit referenced 19'. The received main clock signal tdclk and the loop signal output by the PLL circuit 19' are applied to the phase comparator 27, which in turn generates a signal that is supplied to a charge pump 28. The latter outputs a current signal that is fed to a voltage controlled oscillator (VCO) circuit 30 via a loop filter 29. The VCO circuit 30 is coupled to a frequency divider 31 that supplies said loop signal on line 32. The desired 16 phases are available at the output of VCO circuit 30. They are referenced P0 to P7 for the clock signals obtained on the rising edge of the main clock, and N0 to N7 for those obtained on the falling edge thereof.

Figure 6:
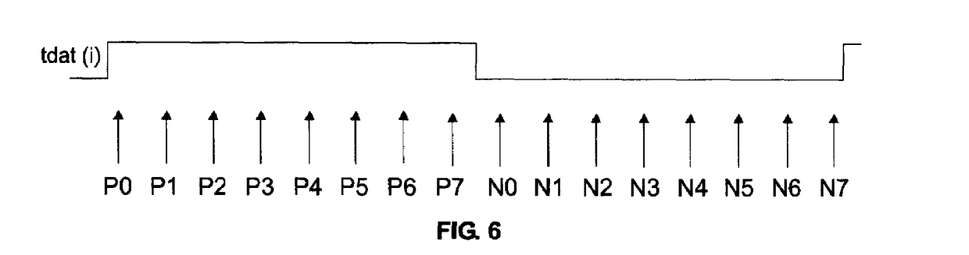
FIG. 6 shows that there is no oversampling when the sampling is performed with the 16-phase PLL circuit depicted in FIG. 5.

As apparent in FIG. 6, if the deskewing mechanism of the present invention is implemented with a 16-phase PLL circuit, there is no oversampling. The spacing between two phases increases if the frequency of the main clock gets lower.

Figure 7:
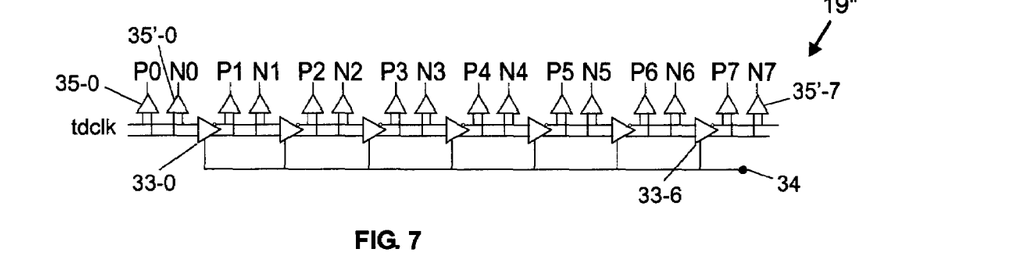
FIG. 7 shows another possible implementation of the multiphase clock generator of FIG. 4 using a standard controlled delay line loop (DLL) circuit constructed with a set of differential buffers and inverters.

FIG. 7 shows another implementation of the multiphase clock generator 19 with a controlled DLL circuit referenced 19". The latter is organized around a series of seven differential buffers 33-0 to 33-6 connected in series, each having an inverting and a non-inverting output, that operate as the delay elements in the chain. They are controlled by an input bias via line 34. At the inputs of the chain and at the outputs of each differential buffer, a pair of inverters 35-0, 35'-0, ..., 35-7, 35'-7 is placed to deliver the positive and the negative clock phases P0, N0, ..., P7, N7 respectively, from the differential main clock tdclk, i.e. the desired 16 clock phases.

Figure 8:
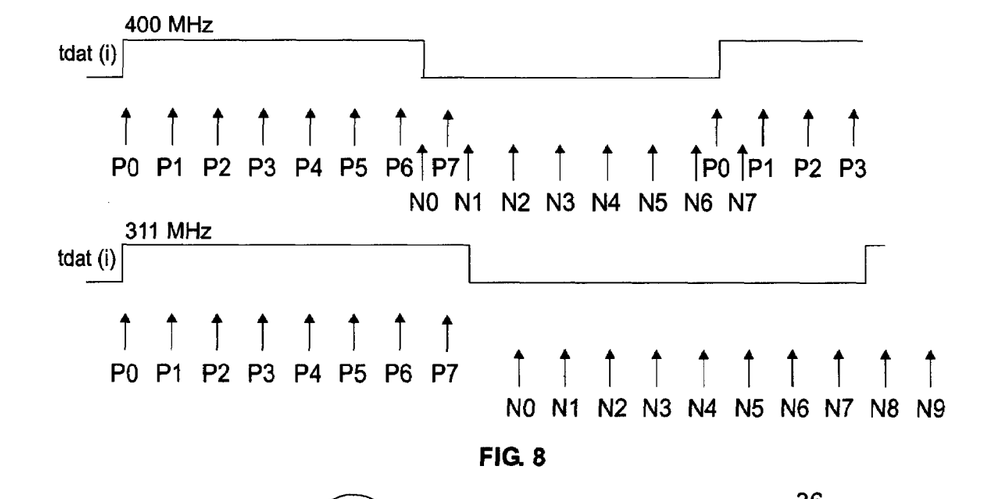
FIG. 8 shows that there is some oversampling when the sampling is performed with the controlled DLL circuit depicted in FIG. 7.

The deskewing will run from 311 to 400 MHz but the controlled delay line generates fixed clock phases. As apparent in FIG. 8, this means that there will be oversampling of some data bits.

2. Description of the Control Logic Block 25

The main task of the control logic block 25 is to detect the training sequences and properly drive the phase selectors. It consists in a finite state machine (FSM) and some counters and flags, but it will rather be described by its functionalities. These counters and flags include:
- a control training word counter, which counts the number of double control training words;
- a data training word counter, which counts the number of double data training words received;
- a bit_deskewed flag which is set high when the deskewing operation has been completed and set low when the reset is active or when a training sequence is going on;
- a training_ongoing flag which is set high when training is going on and is set low otherwise; and,
- a training_mode flag is comprised of two bits according to the following rules: 00==>no training, 01==>sub-bit training, 10==>latch the selected values, and 11==>word training.

Figure 9:
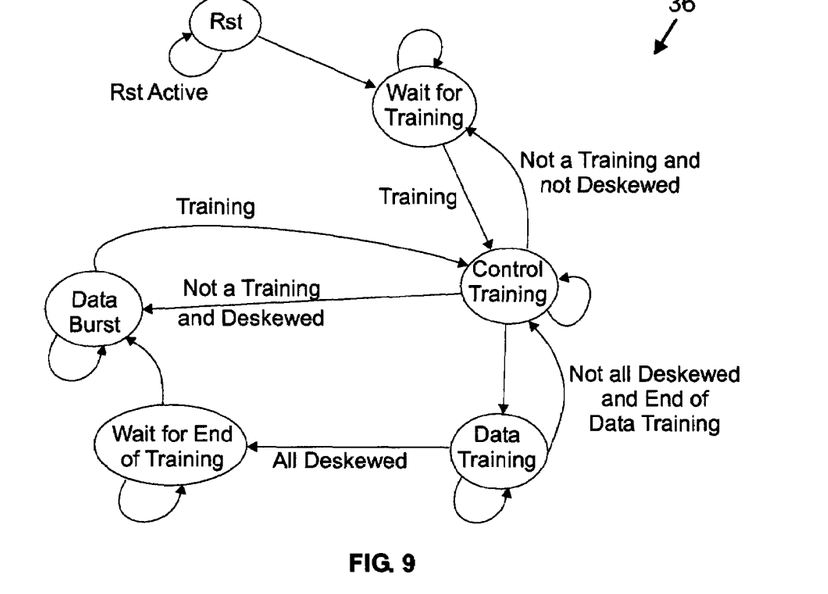
FIG. 9 is a flowchart describing the global operation of the control logic block shown in FIG. 4.

FIG. 9 shows the flow chart referenced 36 that schematically describes the control logic block 25 operation through the different states of the FSM.

Wait_for_training: the FSM stays in this state as long as the incoming data does not contain a suspected training word (0FFF0FFF) with the control bit tctl high. The training control word and training data word counters are reset. The training_ongoing and training_mode flags are reset, too, respectively at '0' and '00'.

Control_training: the training control word counter is enabled while the training data word counter is still reset. It will move to data_training state (see below) if enough training control words are received. If not enough control training words are received, the FSM moves to the wait_for_training state or to the data_burst_state (see below) according to the bit_deskewed flag. The training_ongoing and training_mode flags remain unchanged.

Data_training: the training data word counter is enabled while the training control word counter is reset. The FSM stays in this state during 5 cycles. If enough training data words are received, then the training_ongoing flag is set to '1' and the training_mode flag is set to '01'. When all bit_deskewed (i) signals are set to '1', the bit_deskewed signal will also go high and the training_mode flag will go to '10'. When the bit_deskewed signal and the data_align signal (see below), are set to '1', the deskewing operation is completed and the FSM moves to the wait_for_end_of_training state. If not completed, the FSM goes back to the control_training state. Otherwise, if not enough training data words have been received during these 5 cycles, it was not a training sequence, thus the FSM moves back to the control_training state.

Wait_for_end_of_training: the training control word and training data word counters are reset. The training_ongoing flag is also reset, and it moves to the data_burst state (see below) as soon as the sampled bits, i.e. tdatpx (i), tdatnx (i), tctlp and tctln are not a training pattern anymore. The training_mode flag is set to '11' and the end_of_training signal (see below) is set to '1'.

Data_burst: the training control word and training data word counters are reset. The FSM stays in this state as long as the incoming data bits look like a training control word. The training_mode flag is set to '00'.

3. Description of the Sampler 23

Figure 10:
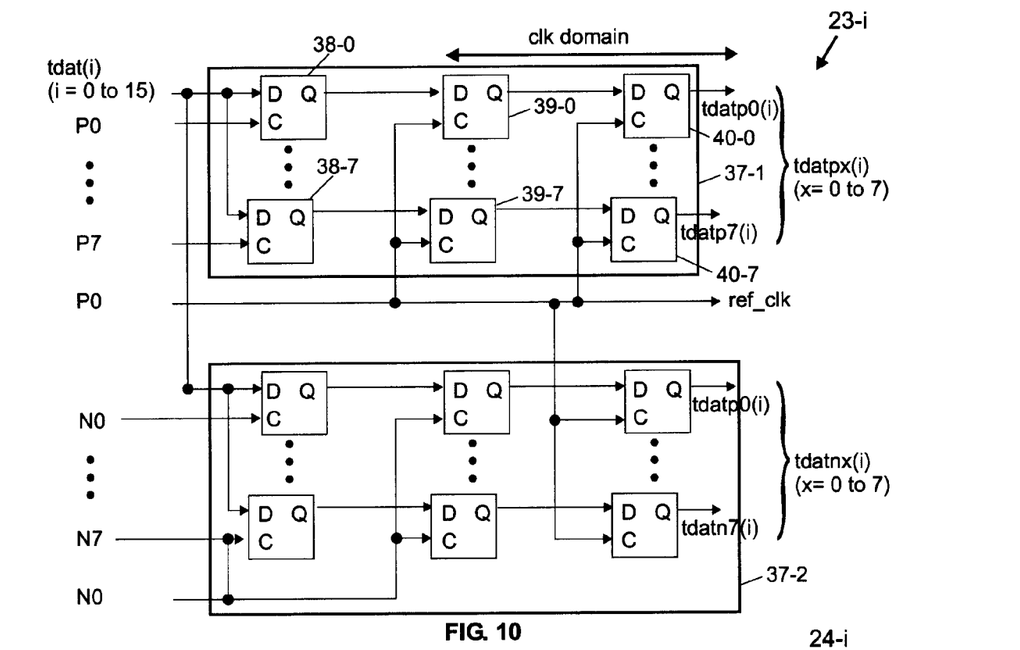
FIG. 10 details the block diagram architecture of a preferred implementation of the sampler shown in FIG. 4.

The logic diagram of the one-bit sampler 23-i is schematically shown in FIG. 10. It is used to sample each data bit and the control bit with the 16 clock phases. As apparent in FIG. 10, it is comprised of two identical slices 37-1 and 37-2. The upper slice 37-1 samples the data bit signals tdat (i) using the positive clock phases P0 to P7 to generate data bits tdatp0(i) to tdatp7 (i) and the lower slice 37-2 samples the data bit tdat (i) using the negative clock phases N0 to N7 to generate data bits tdatn0 (i) to tdatn7(i). As apparent in FIG. 10, the upper slice 37-1 consists in a battery of three columns of eight latches. For each of the eight latches in the first column (in reality each latch consists in a master/slave latch pair), referenced 38-0 to 38-7, the clock input is driven by a determined clock phase, P0 to P7, respectively and their data input receives the data bit tdat (i). Still referring to FIG. 10, the clock phase P0, which has been selected as the reference clock ref_clk, is applied to the clock input of all the remaining latches. The data bits are transferred from the output of the latches forming the first column to the data input of the second column, referenced 39-0 to 39-7. In turn, the data bits output by the latches forming the second column are applied to the data input of the latches forming the third column, referenced 40-0 to 40-7. Finally, this last set of latches, generates eight signals, tdatp0 (i) to tdatp7 (i) that are the incoming data bits sampled with the positive clock phases. A symmetric construction applies to the lower slice 37-2 with respect to the negative clock phases to generate sampled signals tdatn0 (i) to tdatn7 (i). However, in the lower slice, the first and second column of latches are clocked by the phase N0 while the phase P0 is clocking the third column of latches. By this mechanism, both the metastability and the clock domain change are taken care of. The same reasoning applies to sampler 23-16 which samples the control bit tctl to generate control bits tctlp0 (i) to tctclp7 (i) using the positive clock phases P0 to P7 in the upper slice and to generate control bits tctln0 (i) to tctcln7 (i) using the negative clock phases N0 to N7 in the lower slice. Once the sampling is done, the data are moved to the reference clock domain, ref_clk is the clock used by the next circuits. The sampled data and control bits are used by the control logic block 25 described above to check if they are training words. In summary, bit sampler 23-$i$ generates two set of data/control bits sampled with the positive and negative clock phases respectively. Once the 16*17 bits are output, the phase selection operation can start in the corresponding phase selector 24-$i$.

4. Description of the One-Bit Phase Selector 24

Figure 11:
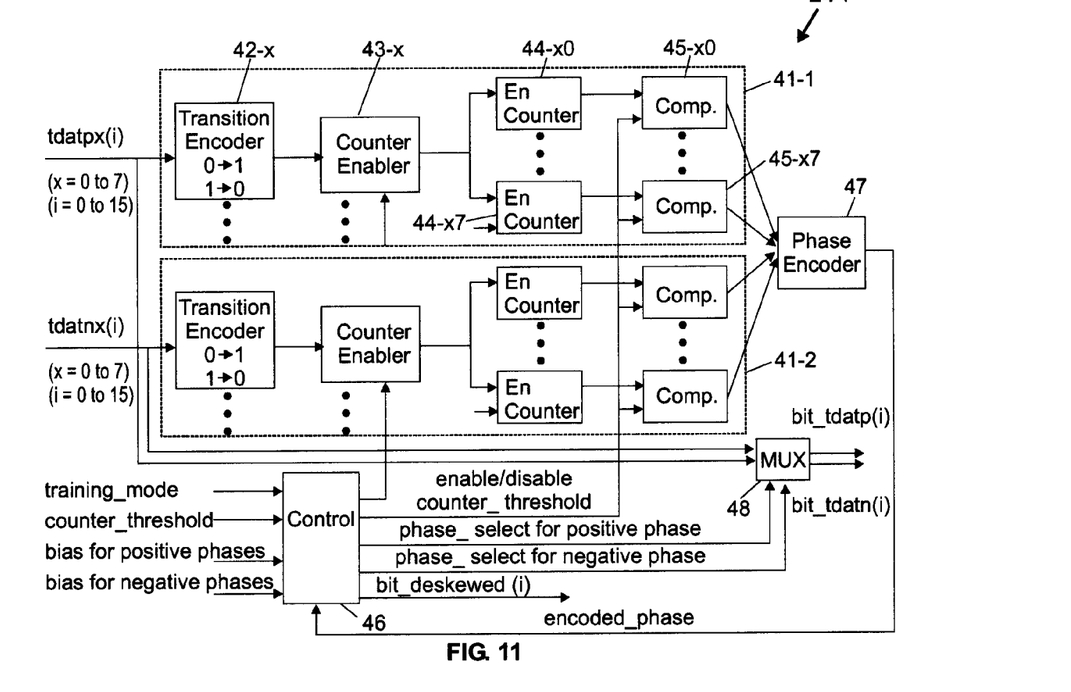
FIG. 11 details the block diagram architecture of a preferred implementation of the phase selector shown in FIG. 4.

The logic diagram of the one-bit phase selector 24-$i$ is schematically shown in FIG. 11. The selector 24-$i$ receives sampled data bits tdatpx (i) to tdatnx (i), wherein x varies from 0 to 7 and i from 0 to 15, i.e. 16 bits coming from the sampler 23-$i$. Sometimes the positive and negative phases can be overlapped (see FIG. 8), so that these two sets of data are processed separately. As apparent in FIG. 11, phase selector 24-$i$ is comprised of two identical slices 41-1 and 41-2. In the upper slice 41-1, sampled data bits tdatpx (i) are applied to a first battery of eight transition encoders, then to a corresponding battery of eight counter enablers, respectively referenced 42-$x$ and 43-$x$, wherein x varies from 0 to 7, respectively. The role of a transition encoder is to detect the transitions 0->1 and 1->0 and to encode the received eight bits in four bits as shown in Table 1 or Table 2 below. The binary value that is output corresponds to the address number of one among the eight counters 44-$x$0 to 44-$x$7, for instance 0000 designates the address of counter N° 0, i.e. counter 44-$x$0, that is associated to sampled data bit tdatp0($i$). To that end, the output of counter enabler 43-$x$ is connected to the enable input of each of said counters while each clock input thereof receives the reference clock ref_clk. The output of each counter, e.g. 44-$x$0, is connected to the first input of a corresponding comparator, e.g. 45-$x$0 which receives the counter threshold information from a dedicated control block referenced 46. All the outputs of comparators 45-$x$0 to 45-x7 in slice 41-1 are applied to a phase encoder 47. Likewise, the latter also receives the eight signals resulting from the processing of sampled data bits tdatnx (i) in the lower slice 41-2. Phase encoder 47 generates the encoded_phase signal that is applied to the control block 46. The training_mode, the counter threshold, and the bias (for positive and negative phases) signals are also applied to the control block 46 as inputs. The role of this control block 46 is to decode the signal representing the training_mode flag. Indeed, depending on the value of the training_mode flag, the control block 46 will enable/disable the counter enablers 43- via the enable/disable signal. Control block 46 generates the selected_phase signal that specifies the two selected phases (positive and negative) that are applied to the control input of the multiplexor 48, which receives data bits tdatpx (i) and tdatnx (i), wherein x varies from 0 to 7, as inputs. In turn, multiplexor 48 generates data bits bit_tdatp (i) and bit_tdatn (i). Likewise, selector 24-16 (not shown) receives sampled control bits tctlp and tctln before processing them the same way. Once the signals generated by phase selectors 24-0 to 24-16, i.e. bit_tdatp (0) to bit_tdatp (15), bit_tdatn (0) to bit_tdatn (15), bit_tctlp and bit_tctln, are gathered, they form the bus 26 shown in FIG. 4. As apparent in FIG. 4, bus 26 is applied to the alignment block 18 with the reference clock signal ref_clk. Considering FIG. 11 again, transition encoders 42-, counter enablers 43-, counters 44-, comparators 45-, the phase encoder 47 and the multiplexor 48 are standard circuits and will not be described further herein.

During the training sequence (training_mode flag=01), the phase selector 24-$i$ looks for a transition 1->0 if the two last bits were 1, or 0->1 when the two last bits were 0. To do so, the transition encoders 42-$x$ are used on each set of 8 bits sampled values in accordance with the conversion scheme depicted in Table 1 or Table 2 below, and the counter enabler 43-$x$ associated therewith enables the correct counter. A counter is dedicated to each of the eight positive and negative clock phases. As apparent in FIG. 11, the counter enabler enables the correct counter with the outputs of the transition encoder and the control block 46. At every clock cycle, all the counters are compared to the counter_treshold flag through comparators 45-. The signals output therefrom are used by the phase encoders 47- to compute the encoded_phase signal. At that time, the control block 46 stores the encoded_phase signal which represents the phase where the transition has occurred the most often. Then, by adding positive and negative bias signals, it selects two phases (one positive and one negative) to select the corresponding data bits tdatpx (i) with the phase_select (for positive phases) signal and tdatnx (i) with the phase_select (for negative phases) signal at a stable position. As apparent in FIG. 8, if two phases meet the criteria to be chosen in the case there is phase overlapping, the less delayed one is chosen because it is more stable, e.g. N0 is preferred to P7. It also sets high the bit_deskewed (i) flag corresponding to that data bit. This bit_deskewed (i) flag will stay high until the training_mode flag is deasserted (00). Tables 1 and 2 below describe the conversion performed by the transition encoders 42.

TABLE 1

| Encode 0 -> 1 | Encode 1 -> 0 |
|---|---|
| 0000000001 ===> 1001 | 1111111110 ===> 1001 |
| 0000000011 ===> 1000 | 1111111100 ===> 1000 |
| 0000000111 ===> 0111 | 1111111000 ===> 0111 |
| 0000001111 ===> 0110 | 1111110000 ===> 0110 |
| 0000011111 ===> 0101 | 1111100000 ===> 0101 |
| 0000111111 ===> 0100 | 1111000000 ===> 0100 |
| 0001111111 ===> 0011 | 1110000000 ===> 0011 |
| 0011111111 ===> 0010 | 1100000000 ===> 0010 |
| 0111111111 ===> 0001 | 1000000000 ===> 0001 |
| 0111111111 ===> 0000 | 0000000000 ===> 0000 |
| 0000000001 ===> 1001 | 1111111111 ===> 1111 |

TABLE 2

| Encode 0 -> 1 | Encode 1-> 0 |
|---|---|
| 0000000001 ===> 1001 | 1111111110 ===> 1001 |
| 000000001X ===> 1000 | 111111110X ===> 1000 |
| 00000001XX ===> 0111 | 11111110XX ===> 0111 |
| 0000001XXX ===> 0110 | 1111110XXX ===> 0110 |
| 000001XXXX ===> 0101 | 111110XXXX ===> 0101 |
| 00001XXXXX ===> 0100 | 11110XXXXX ===> 0100 |
| 0001XXXXXX ===> 0011 | 1110XXXXXX ===> 0011 |
| 001XXXXXXX ===> 0010 | 110XXXXXXX ===> 0010 |
| 01XXXXXXXX ===> 0001 | 10XXXXXXXX ===> 0001 |
| 1XXXXXXXXX ===> 0000 | 0XXXXXXXXX ===> 0000 |
| 0000000001 ===> 1001 | 1111111111 ===> 1111 |

X = dont' care

In these tables, the left values are the possible sampled values that are input during training sequences and the right values are the phases where the transition occurred. The only difference between Tables 1 and 2 is the fact that the first encode scheme is level triggered, while the second encode scheme is edge triggered. The deskewing mechanism can be used to correct relative skew differences of+/−two cycles.

Description of the Alignment Block 18 Overall Architecture

Figure 12:
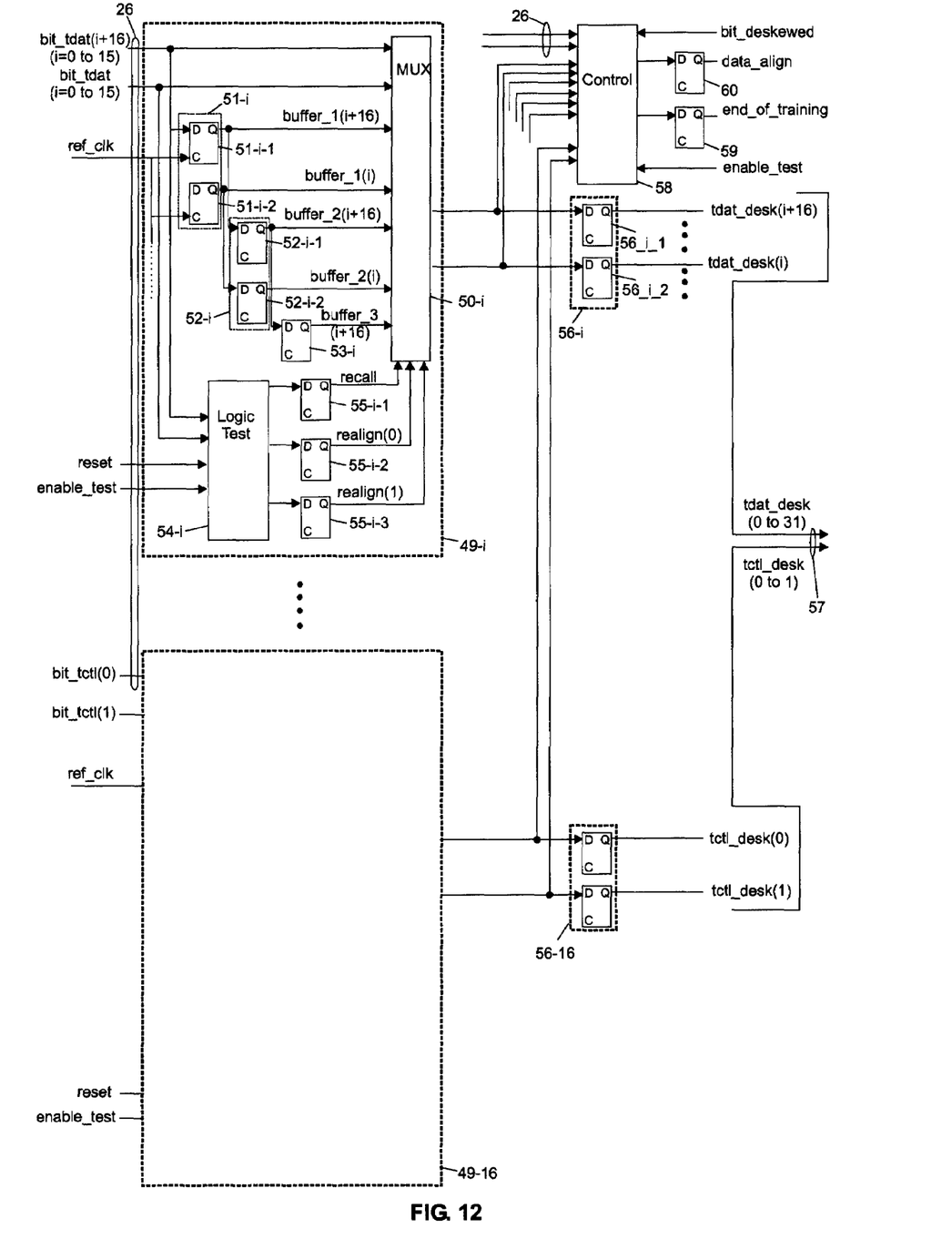
FIG. 12 schematically shows the block diagram architecture of the alignment block of the present invention.

Alignment block 18 will be now described by reference to FIG. 12. Data and control bits output by the deskewing block 17, i.e. bit_tdat (0 to 31) and bit_tctl (0 to 1), are applied to a series of 17 aligners, each handling a couple of data bits, via bus 26. Turning to FIG. 12, data bits bit_tdat (i+16) and bit_tdat (i) belonging to two consecutive data bit patterns, wherein variable i still varies from 0 to 15, are applied to aligner 49-i. These data bits are directly applied to a multiplexor 50-i as inputs and also respectively applied to the data input D of a pair of flip-flops 51-i-1 and 51-i-2 (form sub-block 51-i) to be latched therein. These latched signals, labeled buffer_1(i+16) and buffer_1(i), are applied to said multiplexor 50-i as two other inputs and to the data input of another pair of flip-flops referenced 52-i-1 and 52-i-2 (form sub-block 52-i) that respectively generate signals buffer_2(i+16) and buffer_2(i). In turn, these signals are applied to multiplexor 50-i as two further inputs. Finally, signal buffer_2(i+16) available at the output of flip-flop 52-i-1 is supplied to the data input of flip-flop 53-i which in turn generates a signal labeled buffer_3(i+16), applied to the multiplexor 50-i as a seventh input. Note that, the reference clock signal ref_clk is applied to the clock input C of all the flip-flops mentioned above (and by the way of all the flip-flops implemented in FIG. 12). As a result, seven signals are applied to multiplexor 50i, which thus requires to have three control signals. Still referring to FIG. 12, said data bits bit_tdat (i+16) and bit_tdat (i) are also applied to a logic test block 54-i which also receives the enable_test and reset signals. Logic test block 54-i generate the said three control signals, which once latched in flip-flops 55-i-1, 55-i-2 and 55-i-3, are labelled recal (i), realign0 (i) and realign1(i). Logic test block 54-i basically consists of a combinatorial logic to perform logical functions that will be described by reference to FIG. 13. As apparent in FIG. 12, control signals recal (i), realign0 (i) and realign1(i) are applied to the control inputs of multiplexor 50-i which generates two aligned data bits, labeled tdat_desk (i+16) and tdat_desk (i). These signals which are preferably latched in respective flip-flops 56-i-1 and 56-i-2 (forming buffer 56-i) respectively correspond to data bits bit_tdat (i+16) and bit_tdat (i). Note that all the description related to data bits bit_tdat (i) and bit_tdat (i+16) is also applicable for bit_tctl (0) and bit_tctl (1) processed in aligner 49-16, because all aligners have the same construction. Aligned data bits, tdat_desk (0) to tdat_desk (31) and tctl_desk (0) to tctl_desk (1) output by buffers 56-0 to 56-16 are merged in a single double width bus 57 that transports 32 data bits and 2 control bits.

On the other hand, all the aligned data and control bits generated by aligners 49-0 to 49-16, before latching, are applied to a control block 58. Data bits bit_tdat (i+16), bit_tdat (i) via bus 26 and the bit_deskewed signal are also applied to said control block 58. In turn, control block 58 generates three signals. A first signal, latched in flip-flop 59 is labeled end_of_training, the others are the enable_test and data_align signals mentioned above.

As long as the bit_deskewed signal is low, these three signals will remain low. When the bit_deskewed signal goes high, the enable_test signal detects transitions on the data and control bits sent on data bus 26. It is set to '1' when all these bits are equal to '0' and conversely set to '0' when they are equal to '1'. When the enable_test signal goes low, bits output by multiplexor 50- are checked and the data_align signal goes high if the bits are correctly aligned. The end_of_training signal will go high when said bits are no longer a training pattern.

Operation of the alignment block 18 can be understood in conjunction with the following description. At each rising edge of the reference clock ref_clk, there are two sets of data which are coming from the deskewing block 17, 16 data bits plus one control bit corresponding to the positive edge of the main clock tdclk, and 16 data bits plus one control bit corresponding to its negative edge. The role of deskewing block 17 is to align control/data bits on the reference clock ref_clk (but they remain misaligned with each other), while the role of the alignment block 18 is to realign said deskewed but misaligned control/data bits with the main clock tdclk. The FBATM level 4 and the SPI4 phase 2 standards specify that the training pattern can be used to compensate 1 bit time relative skew between two transmission lines. But the alignment mechanism implemented here has been designed to compensate a relative skew of +/−2 bit times.

For a given bit, the training sequence is composed of 2 phases. During 10 cycles, the bits receive a first value, and then the opposite value during the next 10 cycles. For example: 11111111110000000000, then 00000000001111111111. Since the alignment block 18 receives two bits at the same time, only three configurations can be received during a given cycle, i.e. 00, 01, or 11.

XOR gates are used to find out where the transition has occurred, in or out of this couple of bits. This is done for every of the (16+1) couples of bits. If a transition is found inside one couple of bits, the recal (i) signal is set to '1' for this transmission line, otherwise its value is 'O'. Two other signals labeled realign0 (i) and realign1(i) point out that a transition has been detected between two successive couples of bits. This test takes two cycles maximum to operate.

Figure 13:
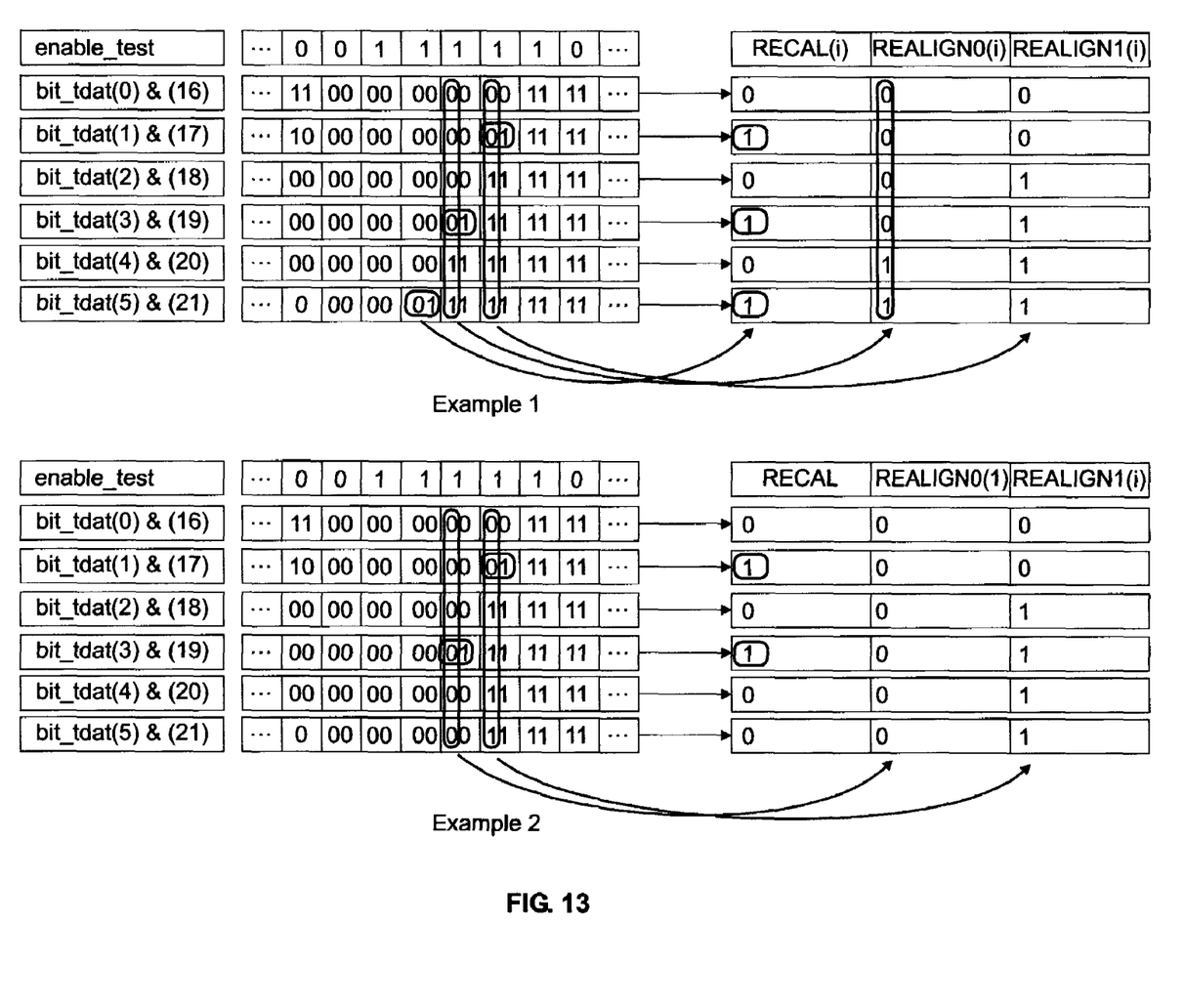
FIG. 13 shows the generation of the three signals recal, realign (0) and realign (1) of FIG. 12 depending upon the value of the enable_test, bit_tdatn (i) and bit_tdatp (i) signals.

The configuration shown in the first of the two examples depicted in FIG. 13 shows six possibilities for the choice of which couple of data bits is to be sent to output signals tdat_desk (i) and tdat_desk (i+16). Signal recal (i) is set to '1' (in latch 55-i-1) when the transition appears within a cycle. The two circled columns is exactly the information (latched in latches 55-i-2 and 55-i-3) representing realign0 (i) and realign1(i) signals. The combination of these three signals is used to indicate the number of cycles between the first and the last transitions that occurred on the data bus 26.

The second example depicted in FIG. 13 describes the case when there is only one cycle of misalignment. In this case, only signal realign1(i) is modified while signal realign0 (i) is let at '0'.

These examples illustrate the role of the realign0 (i), realign1(i) and recal (i) control signals, i.e. to properly drive the multiplexor 50-i to select the appropriate data bits to be output among bit_tdat (i)/bit_tda (i+16), buffer_1 (i)/buffer_1 (i+16), buffer_2 (i)/buffer_2 (i+16), and buffer_3 (i+16).

Indeed, when realign0 (i)=realign1(i)=0, the bits output by multiplexor 50-i are driven from data bits bit_tdat (i) and bit_tdat (i+16). Therefore, there is no delay at all. When realign0 (i)=0 and realign1(i)=1, the bits output by multiplexor 50-i are driven from buffer_1(i) and buffer_1 (+16). Therefore, there is now 1 cycle delay. Finally, when realign0 (i)=realign1 (i)=1, the bits output by multiplexor 50-i are driven from buffer_2 (i) and buffer_2 (i+16), then causing a 2 cycle delay.

On top of that, the realign0 (i) and realign1(i) signals select if the data bits that are output pertain to the same column, or to two different columns. When recal (i)=0, the data bits output from the multiplexor 50-i are driven from one column. Either data bits bit_tdat (i)/bit_tdat (i+16), buffer_1 (i)/buffer_1(i+16), or buffer_2 (i)/buffer_2 (i+16) are output depending on the realign0 (i) and realign1(i) control signals. When recal (i)=1, the data bits are driven from two columns. The first one, i.e. bit_tdat (i+16) is determined by realign0 (i) and realign1(i), while the second one, i.e. bit_tdat (i) is the next one. For instance, when realign0(i)=realign1(i)=1, data bits are driven by buffer_2 (i+16) and by buffer_3 (i), so that there is a half cycle delay.

So, to summarize the behavior of the alignment block 18, on the first cycle, realign1(i) is modified and if a second realignment cycle is required, realign1(i) is copied to give realign0 (i) and then modified with the new values. Not to disturb the data flow, the recal and realign signals are put in temporary buffers during computation and are taken into account only when the enable_test signal goes low.

CONCLUSION

Figure 14A:
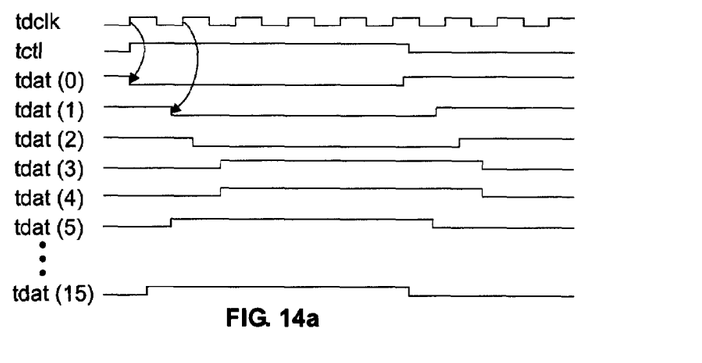
FIG. 14A shows the waveforms of the training patterns (control and data bits, main clock signal) that are received by the deskewing block with skew (inter and intra cycle).

FIG. 14A shows the waveforms of the training patterns (control and data bits, main clock signal) that are received by the deskewing block 17 with skew (inter and intra cycle).

Figure 14B:
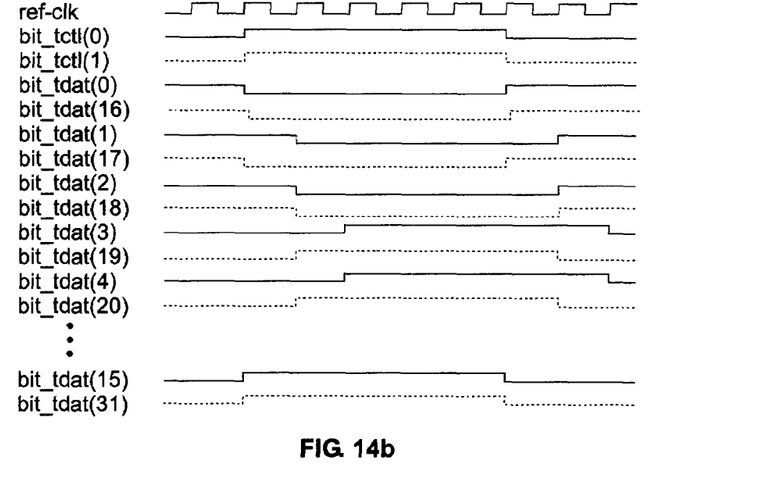
FIG. 14B shows the waveforms of the control and data bits after processing in the deskewing block to illustrate the realignment of these control/data bits with a reference clock signal ref_clk that is internally generated.

FIG. 14B shows the waveforms of the control and data bits after processing in the deskewing block 17 to illustrate the realignment of the control and data bits with a reference clock (ref_clk) that is internally generated.

Figure 14C:
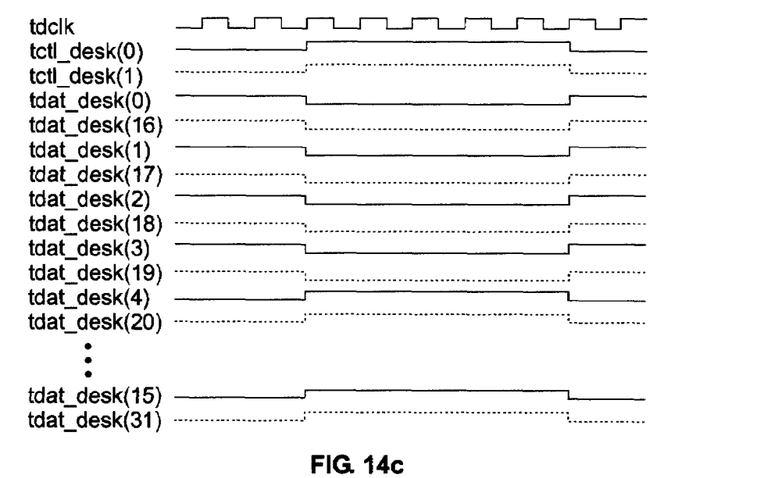
FIG. 14C shows the waveforms of the control and data bits that are obtained after processing in the alignment block to illustrate that they are now aligned on the original main clock signal tdclk.

FIG. 14C shows the waveforms of the control and data bits that are obtained after processing in the alignment block 18 to illustrate that said bits are now aligned on the original main clock signal (tdclk).

In the present implementation, the deskewing/alignment mechanism can be used with a double edge clock running between 311 and 400 Mbits/s, which is equivalent to a 622 Mbits/s to 800 Mbits/s range.

It will be apparent to those skilled in the art that various modifications may be made in the process and products illustratively described therein, without departing from the spirit or scope of the invention as expressed in the following claims.

What is claimed is:

1. An apparatus for deskewing and aligning a plurality of parallel streams of data bits comprising:

deskewing circuitry including:

a multiphase clock generator having an operating frequency and generating a plurality of clock phases;

a plurality of samplers, each sampler operatively coupled to the multiphase clock generator and to one of the streams of data bits;

a plurality of phase selectors, each phase selector operatively coupled to one of the plurality of samplers; and a control logic circuit operatively coupled to each of the plurality of the samplers and to each of the plurality of the phase selectors; and an alignment circuit in operative communication with the deskewing circuitry, including:

a plurality of aligners, each receiving successive pairs of primary data bits from the deskewing circuitry, wherein each aligner further includes:

a first pair of flip-flop shifters generating a pair of data bits delayed by one cycle relative to the primary data bits;

a second pair of flip-flop shifters generating a pair of data bits delayed by two cycles relative to the primary data bits;

a third flip-flop shifter generating a data bit delayed by two and one half cycles relative to the primary data bits;

a logic test circuit generating three control signals; and a single multiplexer operatively coupled to the plurality of flip-flop shifters and the logic test circuitry and operative under control of the three control signals, each directly coupled to the single multiplexer, to generate a pair of aligned data bits; and a control circuitry operatively coupled to each of the plurality of aligners.

2. The apparatus of claim 1, wherein each phase selector includes a transition encoder, a counter enabler, a counter, a comparator and a phase encoder, all in operative communication.

* * * * *

UNITED STATES PATENT AND TRADEMARK OFFICE
CERTIFICATE OF CORRECTION

PATENT NO.      : 7,606,341 B2                                    Page 1 of 1
APPLICATION NO. : 10/710046
DATED           : October 20, 2009
INVENTOR(S)     : David Pereira It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 895 days.

Signed and Sealed this

Twelfth Day of October, 2010

David J. Kappos
*Director of the United States Patent and Trademark Office*